April 18, 1961 E. A. BLASHEWSKI 2,980,428

STYLUS MOUNTING FOR PHONOGRAPH PICKUP

Filed Jan. 8, 1959

Inventor
Eugene A. Blashewski
by Donald L. Welsh
Attorney

2,980,428

STYLUS MOUNTING FOR PHONOGRAPH PICKUP

Eugene A. Blashewski, Maywood, Ill., assignor to Jensen Industries, Inc., Forest Park, Ill., a corporation of Illinois Filed Jan. 8, 1959, Ser. No. 785,728

5 Claims. (Cl. 274—37)

This invention relates generally to a phonograph pickup and, more particularly, to a pickup with two or more styli adapted to follow in differently dimensioned record grooves.

The primary object of the present invention is to provide, in a phonograph pickup of the above character, a novel stylus mounting which is of simple and inexpensive construction, and which may be adjusted easily to locate either stylus selectively in an active position.

Another object is to mount two styli on a single supporting member which is constructed in a novel manner to reduce its cost while enabling each stylus to operate at the same desired rearward inclination with respect to the direction of travel of the record groove after a simple adjustment of the position of the member.

A more detailed object is to project two styli rigidly from different sides of a single elongated supporting member and at the same inclination with respect to the longitudinal axis of the member so that each stylus may be brought into an inclined active position simply by rotating the member about such axis.

Other objects and advantages of the present invention will be apparent from the following description and drawings in which.

Figure 1:
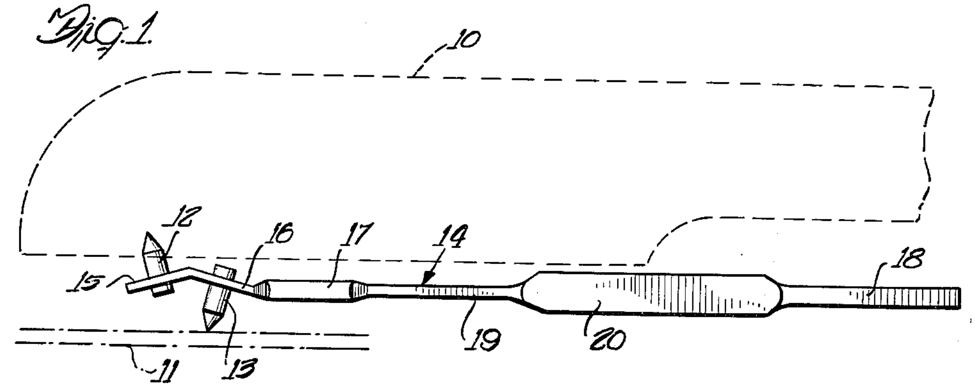
Fig. 1 is a side elevational view of a stylus mounting embodying the novel features of the present invention.
Figure 2:
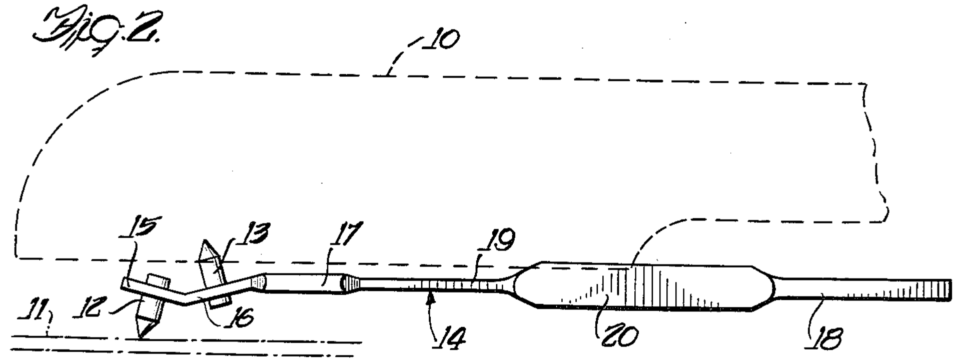
Fig. 2 is a view similar to Fig. 1 but showing the parts in different positions.
Figure 3:
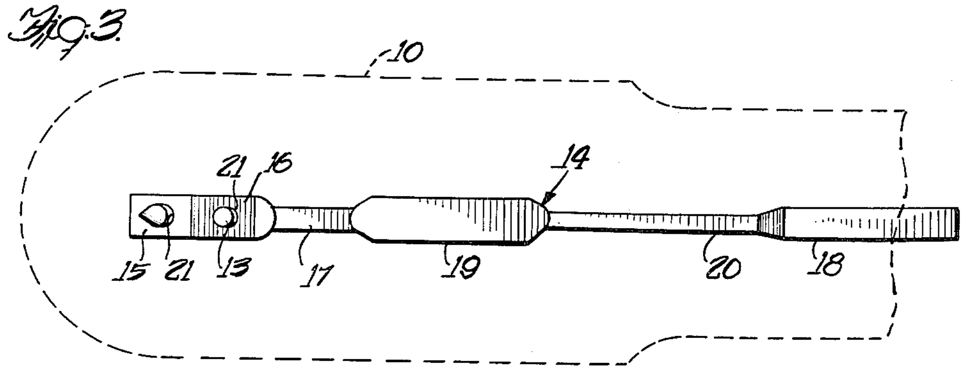
Fig. 3 is a plan view of the mounting.

The invention is shown in the drawings for purposes of illustration in connection with a phonograph pickup having a tone arm 10 supported in the usual manner (not shown) with its outer end extending horizontally over a disk-type record 11 and movable vertically toward and away from the record as well as radially across the spiral groove in the record. Mounted on the outer end of the arm is an electrical mechanical transducer commonly known as a cartridge to which a stylus mounting is connected by a suitable driving means. The stylus mounting supports two styli 12 and 13 of different sizes adapted for use respectively with a standard groove record and with a microgroove record. One stylus or the other is brought into an active position of downward projection from the outer end of the tone arm depending on the type of record and the size of its groove. To obtain an optimum tracking action, it is preferred that, when active, each stylus be inclined upwardly toward the arm from the record and rearwardly with respect to the direction of travel of the record groove past the arm.

In accordance with the present invention, the styli 12 and 13 are mounted on a cartridge on the tone arm 10 in a novel manner facilitating the changeover from one stylus to the other and, at the same time, providing the desired tracking angle for each stylus when it is active. To achieve these ends at low cost, the styli are secured to one end of a single elongated holder 14 which is mounted on a cartridge on the tone arm and rotates about its own longitudinal axis. This rotary motion is utilized to change from one stylus to the other by projecting the styli from different sides of the holder, both styli having the same inclination with respect to the holder axis so as to track at the same angle when active.

The desired angular disposition of the respective styli 12 and 13 with respect to the axis of the holder 14 is effected in a simple and inexpensive manner by inclining successive flattened portions 15 and 16 near one end of the holder in different directions and by projecting the styli individually from these portions outwardly toward the end of the holder and substantially at right angles. With such normal projection of the styli and with the inclination of the flattened portions complementary to the desired inclination of the respective styli relative to the holder axis, the styli are disposed at the desired inclination in their active positions automatically as an incident to rotation of the holder about its axis.

In the present instance, the holder 14 is formed in a few stamping operations performed on a single strip of wire which, in the case of piezoelectric transducers, may be formed of any suitable magnetic material or a nonmagnetic material such as copper or brass. Or in the case of a magnetic transducer, the holder may be formed of magnetic material. The flat inclined styli supporting portions 15 and 16 are inclined in opposite directions with respect to the holder axis, the angle of inclination preferably being approximately 15 degrees to provide a corresponding angle of the styli of 15 degrees with respect to a normal to the record. Adjacent the inner inclined portion 16 is a cylindrical body portion 17. The latter and a similar cylindrical portion 18 at the other end of the holder are connected by two flattened intermediate body sections 19 and 20 which are disposed at right angles to each other, one section 20 providing lateral flexibility of the holder in one of two perpendicular directions and the other section providing such flexibility in the other direction. The two cylindrical portions may be connected to the transducer (not shown) and mounted therewith for rotation about the axis of the holder in a suitable manner well known in the art.

The styli 12 and 13 are formed of sapphire, diamond or osmium and preferably are of generally cylindrical shape with their record engaging ends tapering to accommodate records with different sizes of grooves. To receive the styli, suitable holes 21 are punched in the flat inclined end portions 15 and 16 of the holder, the axes of the holes being normal to the inclined portions. Each stylus may be secured in the hole of its supporting inclined portion in various ways, for example, by a press fit with a suitable cement between the point and the stylus. The outer ends of the respective styli are spaced equal distances from the axis of the holder.

It will be apparent that, with a holder like that described above, one stylus 12 or the other stylus 13 is brought into a downwardly projecting active position simply by rotating the holder about its longitudinal axis which coincides with the common axis of the cylindrical body portions 17 and 18. By extending each stylus perpendicularly to its supporting flat end portion and by supporting the holder horizontally over the record with the holder axis parallel to the record, the inclination of each stylus relative to the record groove is the same as the inclination of the end portion relative to the holder axis. By virtue of this simple relationship, the playing angle of the stylus is determined accurately and yet easily during the formation of the holder and its assembly with the styli. With the end portions 15 and 16 inclined in opposite directions and the styli projecting from opposite sides of the holder and away from the body portion 17, each stylus is inclined rearwardly with respect to the direction of travel of the record so as to avoid wear and gouging.

I claim as my invention:

1. For use in a phonograph pickup, the combination of an elongated stylus holder adapted to be supported for rotation about the longitudinal axis of the holder and including a generally straight body portion extending along such axis, a straight end portion inclined in one direction and at a predetermined angle with respect to said axis and a flat connecting section joining said end and body portions integrally and inclined at said angle and in the opposite direction with respect to the axis, a stylus rigid with said connecting section and projecting at approximately a right angle away from one side of the section so as to be inclined away from said body portion, and a second stylus rigid with said end portion and projecting approximately at a right angle away from the opposite side of the portion so as to be inclined away from said body portion, the projection of said styli from opposite sides of said holder enabling the styli to be brought individually into an active position by rotating the holder about said axis.

2. For use in a phonograph pickup, the combination of an elongated stylus holder adapted to be supported for rotation about the longitudinal axis of the holder and including a generally straight body portion extending along such axis, a straight end portion inclined in one direction and at a predetermined angle with respect to said axis and a flat connecting section joining said end and body portions integrally and inclined at said angle and in a different direction with respect to the axis, a stylus rigid with said connecting section and projecting at approximately a right angle away from one side of the section so as to be inclined away from said body portion, and a second stylus rigid with said end portion and projecting approximately at a right angle away from such end portion so as to be inclined away from said body portion, the projection of said styli from said end portion and connecting section enabling the styli to be brought individually into an active position by rotating the holder about said axis.

3. For use in a phonograph pickup, the combination of an elongated stylus holder adapted to be supported for rotation about the longitudinal axis of the holder and including a generally straight body portion extending along such axis, a straight end portion inclined in one direction and at a predetermined angle with respect to said axis and a flat connecting section joining said end and body portions integrally and inclined at said angle and in a different direction with respect to the axis, a stylus rigid with said connecting section and projecting away from said body portion, and a second stylus rigid with said end portion and projecting away from the end portion so as to be inclined away from said body portion, said styli projecting from different sides of said holder so as to enable the styli to be brought individually into an active position by rotating the holder about said axis.

4. For use in a phonograph pickup, the combination of, a stylus holder adapted to be supported for rotation about a predetermined axis of the holder and including a main body portion, an end portion inclined in one direction with respect to the axis and a connecting section joining said end and body portions and inclined in a different direction with respect to the axis, a stylus mounted on said connecting section and inclined away from said body portion, and a second stylus mounted on said end portion and inclined away from said body portion and said connecting section, said styli projecting from said axis at the same angle but in different directions whereby rotation of the holder about the axis brings the styli individually into an active position for engagement with a record.

5. For use in a phonograph pickup, the combination of, an elongated stylus holder adapted to be supported for rotation about a predetermined longitudinal axis of the holder and including a main body portion, an end portion inclined in one direction with respect to the axis and a connecting section joining said end and body portions and inclined in a different direction with respect to the axis, a stylus mounted on said connecting section and inclined away from said body portion, and a second stylus mounted on said end portion and inclined away from said body portion and said connecting section, said styli projecting from said axis in different directions whereby rotation of the holder about the axis brings the styli individually into an active position for engagement with a record.

References Cited in the file of this patent

UNITED STATES PATENTS

| | | |
|---|---|---|
| 2,601,988 | Chirpening | July 1, 1952 |
| 2,662,121 | Jensen | Dec. 8, 1953 |
| 2,742,295 | Frederick | Apr. 17, 1956 |
| 2,848,559 | Palo | Aug. 19, 1958 |

FOREIGN PATENTS

| | | |
|---|---|---|
| 1,020,466 | Germany | Dec. 5, 1957 |